United States Patent
Miyazaki et al.

(10) Patent No.: US 8,290,869 B2
(45) Date of Patent: Oct. 16, 2012

(54) AUTOMATED TELLER MACHINE SYSTEM AND METHOD AND RELAY CENTER

(75) Inventors: Masaki Miyazaki, Kawasaki (JP); Akira Hasegawa, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 12/125,456

(22) Filed: May 22, 2008

(65) Prior Publication Data

US 2008/0272190 A1 Nov. 6, 2008

Related U.S. Application Data

(63) Continuation of application No. 09/827,154, filed on Apr. 5, 2001, now Pat. No. 7,401,051.

(30) Foreign Application Priority Data

Apr. 7, 2000 (JP) .................................. 2000-106322

(51) Int. Cl.
G06Q 40/00 (2006.01)

(52) U.S. Cl. ................ 705/43; 705/35; 705/39; 705/40; 705/41; 705/42; 235/379; 235/380

(58) Field of Classification Search .................... 705/41, 705/42, 43, 35, 39, 40; 235/379, 380
See application file for complete search history.

(56) References Cited

U.S. PATENT DOCUMENTS

| | | | |
|---|---|---|---|
| 6,012,048 A | 1/2000 | Gustin et al. | |
| 6,073,119 A | 6/2000 | Bornemisza-Wahr et al. | |
| 6,081,791 A | 6/2000 | Clark | |
| 6,223,983 B1 | 5/2001 | Kjonaas et al. | |
| 6,308,887 B1 * | 10/2001 | Korman et al. | 235/379 |
| 6,311,165 B1 | 10/2001 | Coutts et al. | |
| 6,378,770 B1 | 4/2002 | Clark et al. | |
| 6,508,397 B1 | 1/2003 | Do | |
| 6,601,045 B1 | 7/2003 | DePietro et al. | |
| 6,651,880 B1 | 11/2003 | Nakisa | |
| 7,110,981 B1 | 9/2006 | Sidikman et al. | |
| 7,401,051 B2 * | 7/2008 | Miyazaki et al. | 705/43 |

FOREIGN PATENT DOCUMENTS

| | | |
|---|---|---|
| JP | 05067132 | 3/1993 |
| JP | 05274331 | 10/1993 |
| JP | 06274519 | 9/1994 |
| JP | 08030838 | 2/1996 |
| JP | 08096052 | 4/1996 |

(Continued)

OTHER PUBLICATIONS

U.S. Appl. No. 09/827,154, filed Apr. 5, 2001, Notice of Allowance and Fees Due dated Jun. 19, 2008.

(Continued)

*Primary Examiner* — Nga B. Nguyen
(74) *Attorney, Agent, or Firm* — Hoffman Warnick LLC; Douglas A. Lashmit

(57) ABSTRACT

Automated teller machine systems and methods for reducing system development efforts by financial institutions and for providing a financial transaction system that is adapted for using one or more common ATMs. In addition, systems and methods to simplify settlement processing of transactions based on ATMs of each financial institution. ATMs and center systems of financial institutions are dissociated from each other, and a relay center intervenes between them.

20 Claims, 9 Drawing Sheets

FOREIGN PATENT DOCUMENTS

| | | |
|---|---|---|
| JP | 08202925 | 8/1996 |
| JP | 09293104 | 11/1997 |
| JP | 11003374 | 6/1999 |
| JP | 11316788 | 11/1999 |
| JP | 2000067306 | 3/2000 |

OTHER PUBLICATIONS

U.S. Appl. No. 09/827,154, filed Apr. 5, 2001, Final Office Action dated Sep. 21, 2007.

U.S. Appl. No. 09/827,154, filed Apr. 5, 2001, Office Action dated Apr. 9, 2007.

U.S. Appl. No. 09/827,154, filed Apr. 5, 2001, Advisory Action dated Dec. 7, 2006.

U.S. Appl. No. 09/827,154, filed Apr. 5, 2001, Final Office Action dated Aug. 25, 2006.

U.S. Appl. No. 09/827,154, filed Apr. 5, 2001, Office Action dated Feb. 16, 2006.

U.S. Appl. No. 09/827,154, filed Apr. 5, 2001, Restriction Requirement dated Oct. 6, 2005.

B. Tracey; "Cirrus agrees to share its ATMs with Plus", Computers in Banking, vol. 6, No. 4, p. 8,10,12, Apr. 1989.

Richard Mitchell; An unwanted spillover effect?, Credit Card Management, vol. 9, No. 2, p. 14-18, May 1996.

Darla Dernovsek; "ATMs : More than the box has changed", Credit Union Executive Journal, vol. 40, No. 4, p. 6-10 Jul./Aug. 2000.

Alyson Danowski; "ATMs: Here, there and everywhere", Bank Marketing vol. 25, No. 2, p. 53, Feb. 1993.

\* cited by examiner

AUTOMATED TELLER MACHINE SYSTEM AND METHOD AND RELAY CENTER

This U.S. patent application is a continuation application of, and claims priority to, patent application Ser. No. 09/827,154, filed on Apr. 5, 2001 now U.S. Pat. No. 7,401,051.

BACKGROUND OF THE INVENTION

1. Field of the Invention

This invention relates to an automated teller machine (ATM) of a financial institution and, more particularly, to a financial system or the like for providing financial services by using a common ATM.

2. Related Art

For a retail transaction (petty financial transaction) in a financial institution, a cash dispenser (CD) and/or an automated teller machine (ATM) have been used over the years to automate a withdrawal and/or a deposit of cash. In this specification, these machines are collectively called an "ATM" or "automated teller machine". In a transaction using an ATM, such as the one that uses an ATM at a particular bank to withdraw a deposit from an account at another bank, it is normally necessary to pay a predetermined service charge, which results in insufficient service to the customer. Thus, there has been proposed a common ATM scheme, which makes a service charge among the involved financial institutions free if an ATM at a particular bank is used.

FIGS. 1A and 1B are pictorial representations for explaining a concept of the conventional common ATM scheme. FIG. 1A shows a normal case, whereas FIG. 1B shows a specific network case. In the normal case shown in FIG. 1A, Bank A's ATM 201 and Bank B's ATM 203 are connected to Bank A's center 202 and Bank B's center 204, respectively. An ATM of each bank is managed at a center of each bank. Bank A's center 202 and Bank B's center 204 are connected by a relay center 205, which may comprise a system(s) (e.g., "BANCS") for interconnecting large city-based commercial banks, a system(s) (e.g., "ACS") for interconnecting provincial banks, or a system(s) (e.g., "MICS") for interconnecting the former systems. In these cases, transactions with another bank may be limited to "withdrawal" and "balance inquiry" alone. If, in such a system, Bank A and Bank B open doors to each other, both banks may reciprocally waive a service charge.

On the other hand, the specific network case shown in FIG. 1B is exploited by a group of closely related banks, for example, a group located in a limited regional area. In this case, Bank A's ATM 211, Bank B's ATM 213 and Bank C's ATM 215 are connected to Bank A's center 212, Bank B's center 214 and Bank C's center 216, respectively. Similarly to FIG. 1A, an ATM of each bank is managed at a center of each bank. In the specific network case shown in FIG. 1B, there is an exemplary model arranged so that centers of respective banks mutually engage in development of a system, which covers not only "withdrawals" and "balance inquiries" but also "deposits."

As noted above, according to the scheme shown in FIG. 1A, possible transactions with another bank are limited to "withdrawal" and "balance inquiry", and no other transactions are allowed. Also, even in an exemplary situation where a customer of Bank B uses Bank A's ATM 201, Bank A's ATM 201 is operated to display a menu commonly used for banks other than Bank A. Since such a menu is developed by Bank A, it may happen that the customer of Bank B has difficulty completing his/her transaction at Bank A's ATM 201 in a fully understandable manner.

Also, in the specific network case shown in FIG. 1B, respective banks are mutually required to engage in system development. Thus, this specific network is also, in substance, limited in services. Further, since cash money is loaded into each ATM by its bank, it is necessary to make settlements among the banks involved. For example, if the number of banks increases to "n", such settlements need to cover a number of combinations, being equal to (n*(n−1)/2), which causes system development at a center of each bank to be very complicated. More particularly, if the specific network shown in FIG. 1B is to be organized by eight individual banks, it is necessary to carry out system development covering 28 different combinations, i.e., 8*7/2=28 according to the above formula. Because of such complicated system development, it is practically impossible to get a number of banks involved with system development. Thus, it has been impractical to expand this system to the extent that it encompasses a wide range of banks. Moreover, with respect to a menu displayed on a screen of an ATM at a particular bank, a customer of another bank is required to conduct his/her transaction using the particular bank's menu, which may not necessarily lead to his/her satisfactory transaction.

In view of the foregoing, there is a need in the art for a system that reduces system development efforts required of financial institutions to provide a financial transaction system that is adapted for using one or more common ATMs. In addition, there is a need for a system to simplify transaction settlement processing based on ATMs of each financial institution. It would also be advantageous if a customer, who has an account at another financial institution, could conduct his/her transaction at an ATM that is managed by a particular financial institution using a menu screen that is created by another financial institution. It would be even further advantageous if transactions with a common ATM, which is managed by a particular financial institution, may be expanded on a building block basis through an individual system development by another financial institution.

SUMMARY OF THE INVENTION

The invention provides a mechanism by which one or more automated teller machine (ATMs) and center systems of financial institutions are dissociated from each other, and a relay center system (hereafter called "relay center") is caused to intervene between them. In an exemplary case of conducting a transaction at an ATM managed by Bank A using a card for Bank B, a transaction request message may be directly transmitted to Bank B without passing through Bank A.

In one aspect of the invention is provided a method of handling a financial transaction using an automated teller machine that accepts an account identifying medium for identifying an account at one of a plurality of financial institutions, the medium being provided by the one of a plurality of financial institutions. The method comprises the steps of: identifying an associated financial institution, with which a transaction is to be conducted, based on the account identifying medium inserted into the automated teller machine; creating an associate transaction request message based on information of the identified associated financial institution; transmitting the created associate transaction request message to a computer system of the associated financial institution through a relay center, without passing through a computer system of another financial institution; and receiving an associate transaction response message corresponding to the transaction request message from the computer system of this associated financial institution through the relay center. Note here that "associated financial institution" means a financial institution that is associated with another financial institution to jointly provide one or more services using the common ATM scheme implemented by this invention.

The method may be characterized in that a counter provided in the relay center for each associated financial institution separately is updated based on the transaction request message or the transaction response message. This feature is desirable in that it allows accumulation of transaction information of each associated financial institution in the relay center, thereby simplifying settlement processing. More particularly, if a counter is updated based on the transaction response message transmitted from an associated financial institution, it is possible to accumulate the transaction information based on a transaction content associated with a defined amount of withdrawal or the like, thereby increasing credibility.

Preferably, this automated teller machine is managed by a particular financial institution (managing financial institution), which is solely responsible for management of the common ATM such as maintenance thereof on behalf of other associated financial institutions. Note, however, that it does not necessarily deliver cash money in terms of settlement processing to be described below. In light of the above, the method is characterized by the further steps of: identifying a non-associated financial institution, with which a transaction is to be conducted, based on the account identifying medium inserted into the automated teller machine; creating a non-associate transaction request message based on information of the identified non-associated financial institution; transmitting the created non-associate transaction request message to a computer system of the particular financial institution through the relay center; and conducting a transaction with the non-associated financial institution through the computer system of the particular financial institution. According to this arrangement, a customer is allowed to conduct a transaction with a non-associated bank, which does not participate in the present system, by using this automated teller machine.

In another aspect, this invention provides a method of displaying financial transaction menu screens on a display of an automated teller machine that is managed by a predetermined managing financial institution. The method comprises the steps of: accepting a medium that has identification information for identifying an account at one of a plurality of financial institutions; identifying a financial institution based on the accepted medium; and if the identified financial institution is not the managing financial institution, displaying a financial transaction menu screen unique to the identified financial institution on the display in place of a menu screen created by the managing financial institution. In an exemplary case where a card for Bank B is inserted into an ATM that is managed by Bank A, it is possible to display one or more menu screens for Bank B on the ATM, thereby allowing a customer to conduct his/her transaction with Bank B at the ATM that is managed by Bank A.

The method may further provide that after this financial institution is identified, a menu screen previously stored in the automated teller machine is displayed on the display as an initial transaction menu, and one or more succeeding menu screens received from a remote location are displayed on the display. According to such an arrangement, it is possible to eliminate time required for communicating the initial transaction menu before its display, thereby enabling immediate actions to be performed. This feature is advantageous in that there is no need for this automated teller machine to have all of the menu contents and, thus, it has no need to have a large memory capacity.

Further, this invention provides a method of displaying menu screens for use in financial transactions with an associated financial institution and a non-associated financial institution on a display of an automated teller machine that is managed by a managing financial institution. The method comprises the steps of: if a card for the associated financial institution is accepted, identifying this associated financial institution based on the card and displaying a menu screen unique to the identified financial institution on the display; and if a card for the non-associated financial institution is accepted, displaying a menu screen for a non-associated financial institution created by the managing financial institution on the display.

In another aspect, this invention provides a system of using an automated teller machine, which comprises: an automated teller machine for identifying a financial institution based on an account identifying medium to conduct a financial transaction with a customer; a plurality of financial institution systems for conducting transactions with this automated teller machine; and a relay center for relaying transactions between the automated teller machine and the financial institution systems; wherein the relay center transmits a transaction request message from the automated teller machine to one of the financial institution systems identified by the automated teller machine without passing through another financial institution system, and wherein the relay center transmits a transaction response message transmitted from the identified financial institution system to the automated teller machine.

The system may be further characterized in that the identified financial institution system updates counters provided therein based on the transaction request messages or the transaction response messages, and that the relay center updates counters provided therein based on the transaction request messages or the transaction response messages. The system may be further characterized in that the relay center defines a settlement amount after exchanging information of the counters provided in the identified financial institution systems and the counters provided in the relay center. The system may be further characterized in that the automated teller machine is managed by a particular financial institution, and that a settlement with the relay center is performed by the particular financial institution or a selected financial institution other than the particular financial institution. If the settlement is performed by the selected financial institution, that financial institution performs a settlement with another financial institution. With these arrangements, a settlement of each financial institution may be centralized at the relay center, thereby enabling smooth settlement processing performance.

This invention is also directed to a system of using an automated teller machine, which comprises: an automated teller machine for identifying a financial institution based on an account identifying medium to conduct a financial transaction with a customer; a plurality of financial institution systems for conducting transactions with this automated teller machine; and a relay center for relaying transactions between the automated teller machine and the financial institution systems; wherein the automated teller machine enciphers a personal identification number inputted by the customer and transmits the enciphered personal identification number to the relay center for use in the identified financial institution, wherein the relay center transmits the enciphered personal identification number to the identified financial institution system, and wherein the identified financial institution system deciphers the enciphered personal identification number. More particularly, this invention is characterized in that this financial institution system has a private key and a public key, that the automated teller machine receives the public key from the financial institution system through the relay center, and enciphers the personal identification number using a public key which is different for each financial institution, and that the financial institution system uses the private key for deciphering the personal identification number enciphered by the public key. With these arrangements, each bank's center alone having a private key is capable of deciphering. Thus, it is possible to overcome the problems such as exposure of a personal identification number on line and/or at the relay center.

In another apparatus aspect, this invention is directed to an automated teller machine that is managed by a predetermined managing financial institution and is adapted for displaying menu screens for use in financial transactions on a display. The ATM comprises: means for receiving menu screen information through a network, the menu screen information being created by each of a plurality of financial institutions; means for storing the menu screen information received from the receiving means; means for accepting a medium for identifying an account at a financial institution; means for identifying the predetermined managing financial institution or another financial institution based on the medium accepted by the accepting means; and means, responsive to the identifying means that identifies another financial institution, for reading the menu screen information for another financial institution from the storing means for display of one or more menu screens on the display.

The automated teller machine may be further characterized in that this receiving means receives menu screen information from one or more associated financial institutions including the predetermined managing financial institution, that the storing means stores the menu screen information from the associated financial institutions received by the receiving means, and additionally stores menu screen information for a non-associated financial institution created by the predetermined managing financial institution.

The ATM may be further characterized in that the reading and displaying means, responsive to the identifying means that identifies the non-associated financial institution based on the medium, displays one or more menu screens based on the menu screen information for the non-associated financial institution that is created by the predetermined managing financial institution and stored in the storing means.

The automated teller machine may be further characterized in that after the financial institution is identified by the identifying means, this reading and displaying means immediately reads initial menu screen information from the storing means and, thereafter, this reading and displaying means reads succeeding menu screen information received from the receiving means and stored into the storing means.

Further, the invention is directed to a relay center connected between an automated teller machine and a plurality of financial institution systems through a network, which comprises: means for receiving a transaction request message from the automated teller machine and for transmitting the transaction request message to a particular financial institution system; means for receiving a transaction response message corresponding to the transaction request message from the particular financial institution system and for transmitting the transaction response message to the automated teller machine; and means for updating a counter provided for each financial institution based on the transaction request message or the transaction response message.

In addition, this invention is directed to a relay center connected between an automated teller machine and a plurality of financial institution systems through a network. The relay center comprises: means for storing a transaction content for each particular financial institution into a counter provided for each financial institution separately based on a transaction conducted between the automated teller machine and a particular financial institution system; means for receiving counter information owned by the particular financial institution system from the particular financial institution; and means for transmitting information of the counter provided for each financial institution separately, which has the transaction content stored by the storing means, to the particular financial institution system; wherein the counter information is exchanged by the receiving means and the transmitting means.

The relay center may be further characterized in that it is additionally provided with means for accumulating settlement information that is operable after exchange of the counter information among the plurality of financial institution systems is finished by the receiving means and the transmitting means. This arrangement is preferable in that only one financial institution may be selected as a centralized settlement financial institution.

DETAILED DESCRIPTION OF THE PREFERRED EMBODIMENTS

Figure 1A:
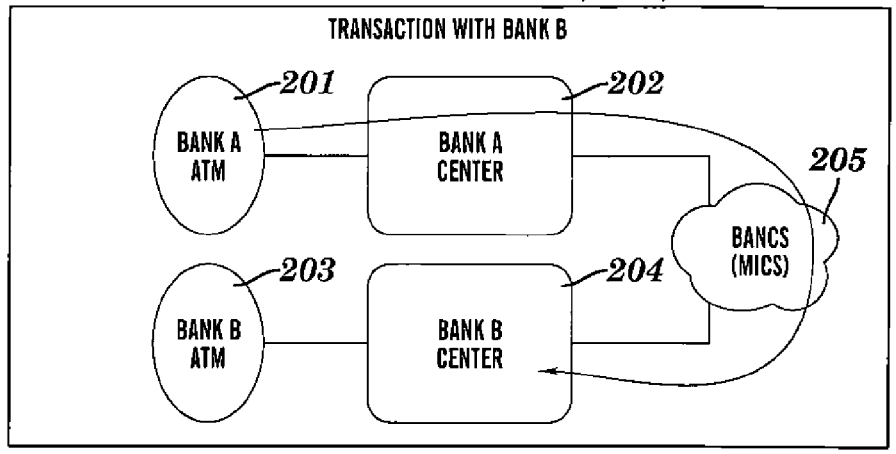
FIGS. 1A-1B are pictorial representations illustrating prior art common ATM schemes.
Figure 1B:
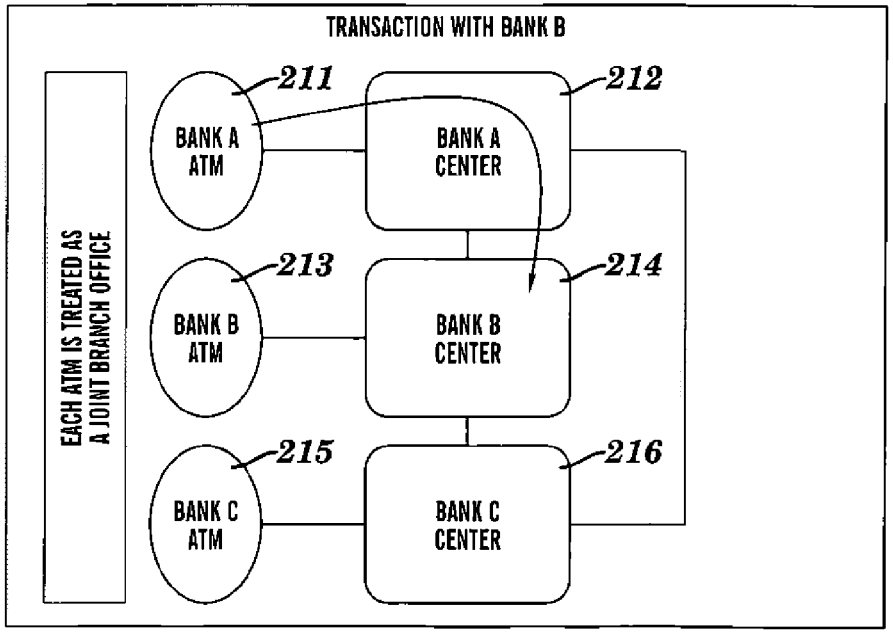
Figure 2:
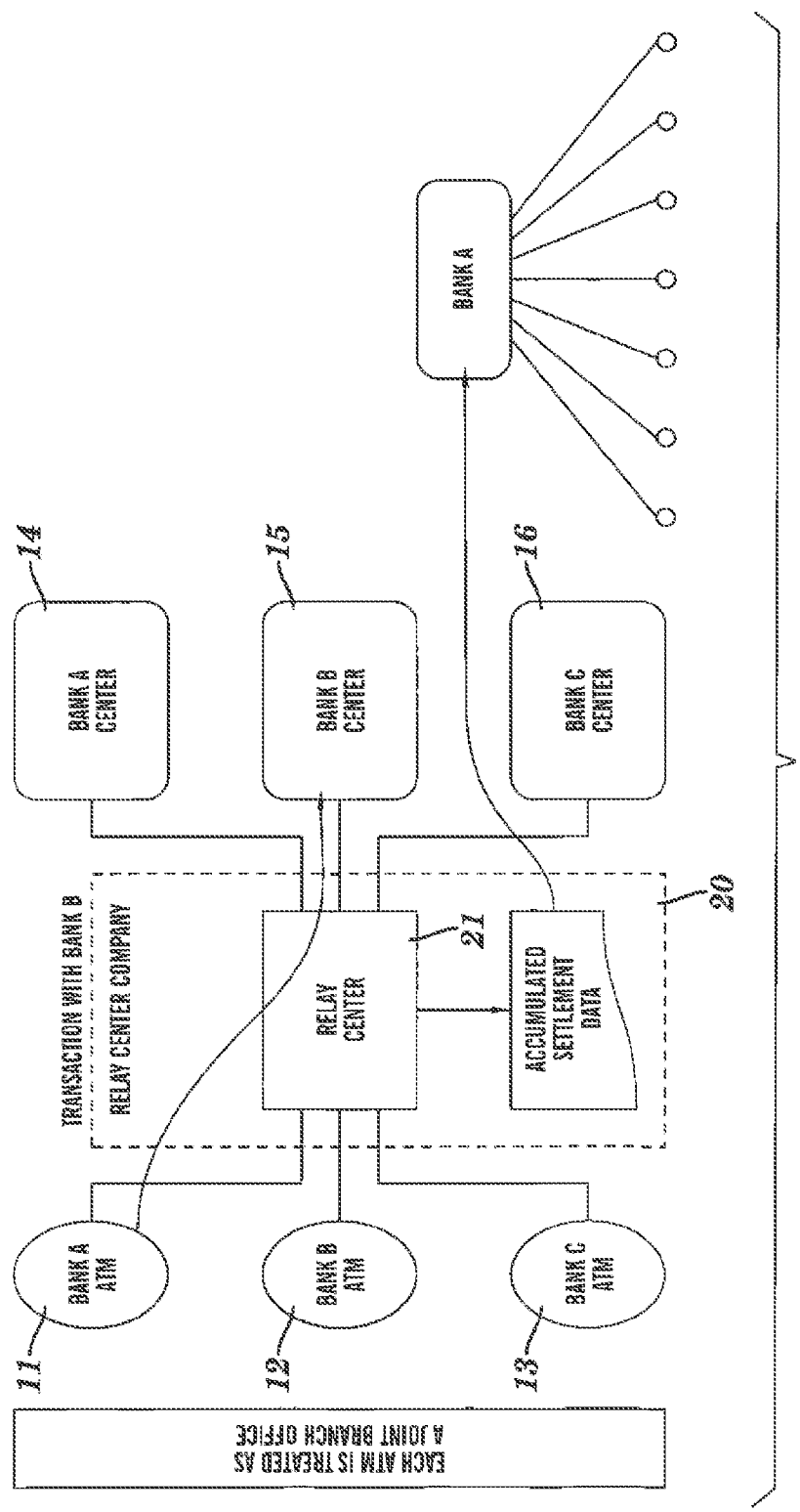
FIG. 2 is a pictorial representation illustrating a system configuration in accordance with a preferred embodiment of the present invention.

FIG. 2 is a pictorial representation illustrating a system configuration of a preferred embodiment of the present invention. The embodiment is configured such that automated teller machines 11, 12, 13 (ATMs) and center systems of financial institutions such as banks 14, 15, 16 (hereafter simply called "centers") are dissociated from each other, and that a relay center 21 of a relay center company 20 is caused to intervene between them. More particularly, Bank A's ATM 11, Bank B's ATM 12 and Bank C's ATM 13 are connected to Bank A's center 14, Bank B's center 15 and Bank C's center 16, respectively, through relay center 21. Relay center 21 is managed by relay center company 20. Notations of Bank A's ATM 11, Bank B's ATM 12 and Bank C's ATM 13 mean that Bank A, Bank B and Bank C are responsible for managing these ATMs, which may be installed by relay center company 20. These notations do not necessarily mean that these ATMs are installed at the respective banks. For example, these ATMs may be installed at shops or facilities such as convenience stores. In such a situation, Bank A becomes a store managing bank for Bank A's ATM 11, Bank B becomes a store managing bank for Bank B's ATM 12, and so on. Note, however, that all banks are registered as branch offices, and expenses accrue from ATMs as joint branch offices are shared by all banks.

Using the system shown in FIG. 2, when a card for Bank B (i.e., a medium for identifying an account at Bank B) is inserted into, for example, Bank A's ATM 11, a transaction request message is directly transmitted to Bank B's center 15 without passing through Bank A's center 14. This allows a transaction to be conducted. In addition, this makes it unnecessary to carry out system development at Bank A's center 14 for processing a transaction with Bank B. As described, since a request for transaction with each bank is directly transmitted to its center, relay center company 20 is adapted for accumulating transactional information of each bank and for making settlements using this data. This settlement data is sent to Bank A as a settlement bank, for example, and a flow of settlements is simplified by making settlements among Bank A and other banks.

Figure 3:
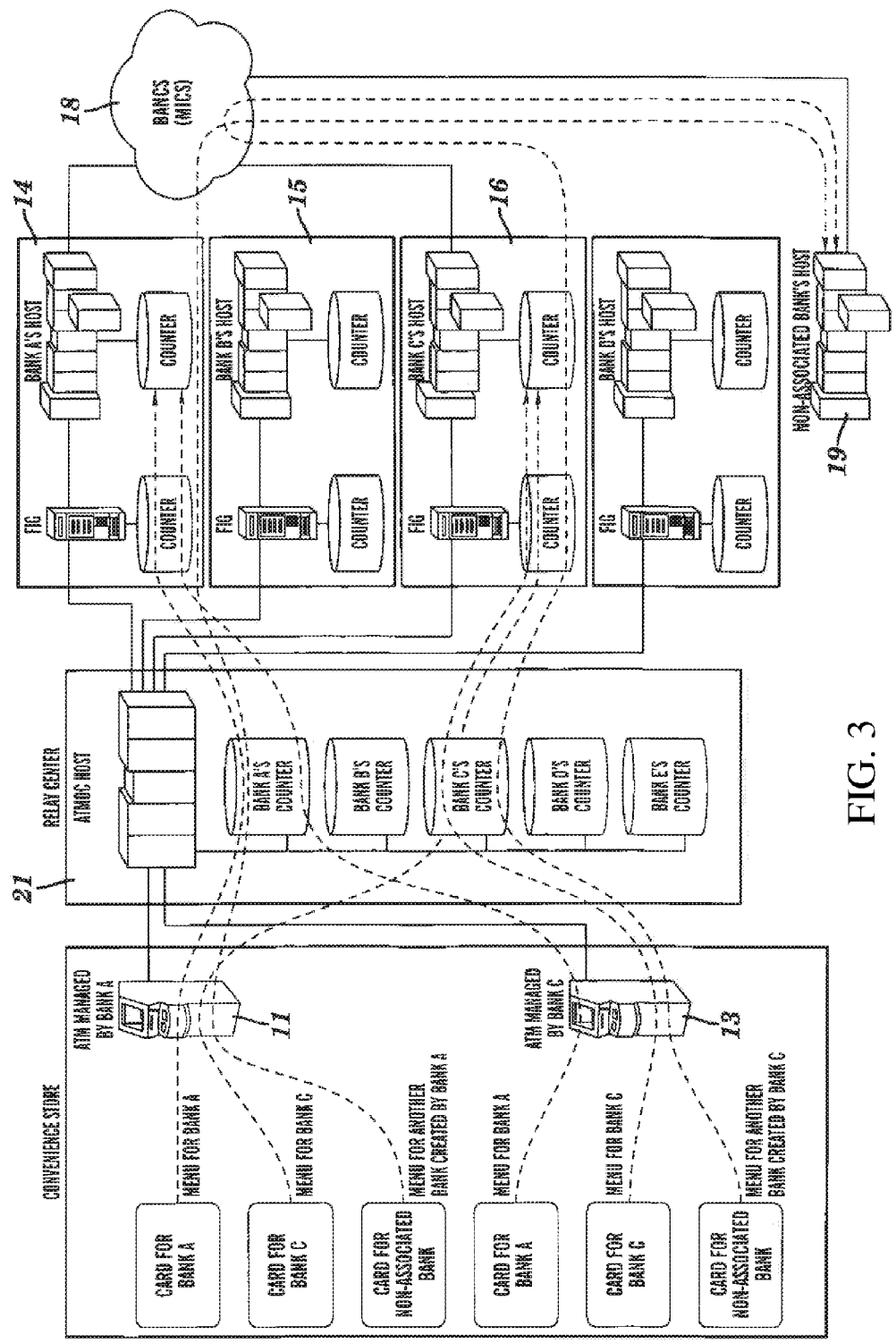
FIG. 3 is an illustration showing a flow of transactions between a bank participating in the system of FIG. 2 (associated bank) and a non-associated bank.

FIG. 3 is an illustration showing a flow of transactions between one or more banks participating in the present system (associated banks) and a non-associated bank. More particularly, FIG. 3 shows a situation where a card for Bank A, a card for Bank C and a card for a non-associated bank are inserted into Bank A's ATM 11 (ATM managed by Bank A) and Bank C's ATM 13 (ATM managed by Bank C) installed, for example, at a convenience store. For example, when a card for Bank A or a card for Bank C is inserted into Bank A's ATM 11 for conducting a transaction, the related transaction content is transmitted to an FI gateway (FIG) counter of Bank A's center 14 or a FIG counter of Bank C's center 16 by way of a Bank A's counter or a Bank C's counter in relay center 21, respectively. Then, the transaction content is passed from relay center 21 to a counter of Bank A's host system or a counter of Bank C's host system, respectively. Similarly, when a card for Bank A or a card for Bank C is inserted into Bank C's ATM 13 for conducting a transaction, the related transaction content is passed to the Bank A's counter or Bank C's counter by way of the Bank A's counter or the Bank C's counter, respectively, provided in relay center 21.

Next, when a card for a non-associated bank is inserted, the present embodiment operates as described below. More particularly, when a card for a non-associated bank is inserted into Bank A's ATM 11 (managed by Bank A) for conducting a transaction, its related transaction content is stored in the counter of Bank A's center 14 by way of the Bank A's counter located at relay center 21, and then it is transmitted to the non-associated bank's host 19 by way of conventional relay center 18 such as BANCS or the like. Similarly, when a card for the non-associated bank is inserted into Bank C's ATM 13 (managed by Bank C) for conducting a transaction, its related transaction content is stored in the counter of Bank C's center 16 by way of the Bank C's counter located at relay center 21, and then it is transmitted to the non-associated bank's host 19 by way of conventional relay center 18 such as BANCS or the like. When a card for the non-associated bank is inserted into an ATM, its related transaction content is transmitted between a host system of a bank that manages this ATM and the non-associated bank's host system 19. Because the present system is so configured, it is possible to smoothly conduct a transaction with a non-associated bank (which does not participate in the present system) by using a host system of an associated bank that manages the ATM involved in the instant transaction.

Further, in the present embodiment, even when a card for Bank C is inserted into Bank A's ATM 11, for example, a customer is allowed to conduct his/her transaction using a menu created by Bank C and vice versa. Further, when a card for a non-associated bank that does not participate in the present system is inserted into Bank A's ATM 11 (or Bank C's ATM 13), a customer is allowed to conduct his/her transaction using a menu displayed on its screen for use in a transaction with the non-associated bank that is created by Bank A (or Bank C).

Figure 4:
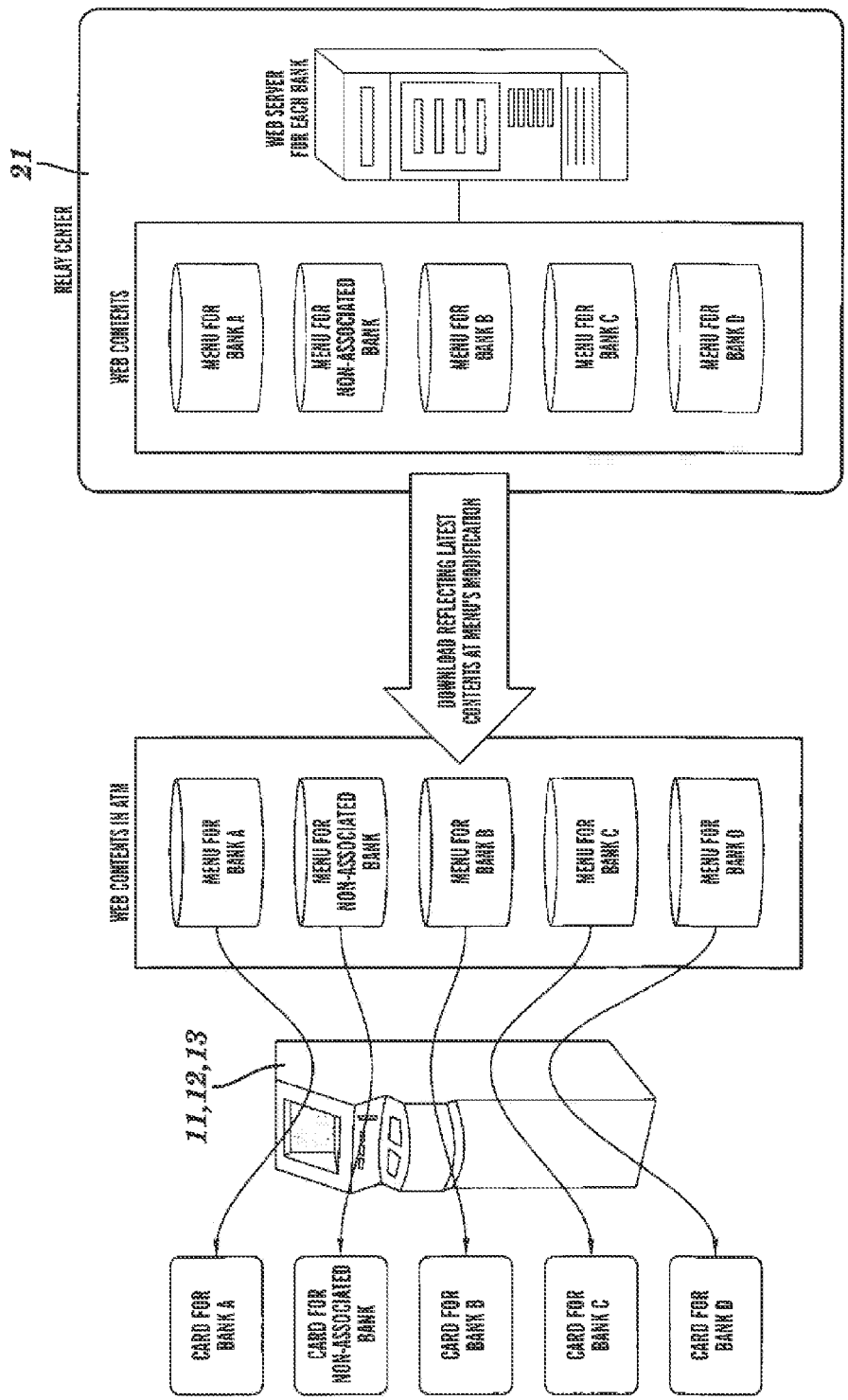
FIG. 4 is a pictorial representation illustrating an initial screen display arrangement for each bank.

FIG. 4 is a pictorial representation illustrating an arrangement of displaying an initial screen for each bank. Cards for Bank A through Bank D (associated banks) and a card for a non-associated bank, each being in the form of a magnetic card or an IC card, are medium for storing information or the like that identifies account numbers at the respective banks. When a card is inserted into an ATM such as Bank A's ATM 11, Bank B's ATM 12 or Bank C's ATM 13, this ATM may be operated to access its internally stored data (e.g., web content created in a predetermined format such as HTML or the like), whereby an initial screen for the bank is acquired and displayed on a screen of this ATM. In the present embodiment, besides this initial screen, those menus that are necessary for accounting work such as deposit/withdrawal processing that must be displayed to a customer (user) with speed may be previously stored into an ATM as web content. On the other hand, with respect to sub-screens other than these menus such as information screens or the like, their contents may be obtained by each ATM from relay center 21 on a demand basis. Relay center 21 is provided with a web function as one of its components, whereby it functions as a web server for each bank separately and contains web content for use in ATMs as menus for each bank. Note, however, that if a memory of web content in an ATM has a enough room, all screens for use in a transaction may be stored in that ATM.

Further, in the present embodiment, if an initial guidance screen (initial screen) of a bank is modified, the menu of the bank so modified may be downloaded to one or more ATMs from the web content of relay center 21. Thus, at anytime, each ATM is capable of displaying the latest initial guidance screen for each bank separately to a user.

Figure 5:
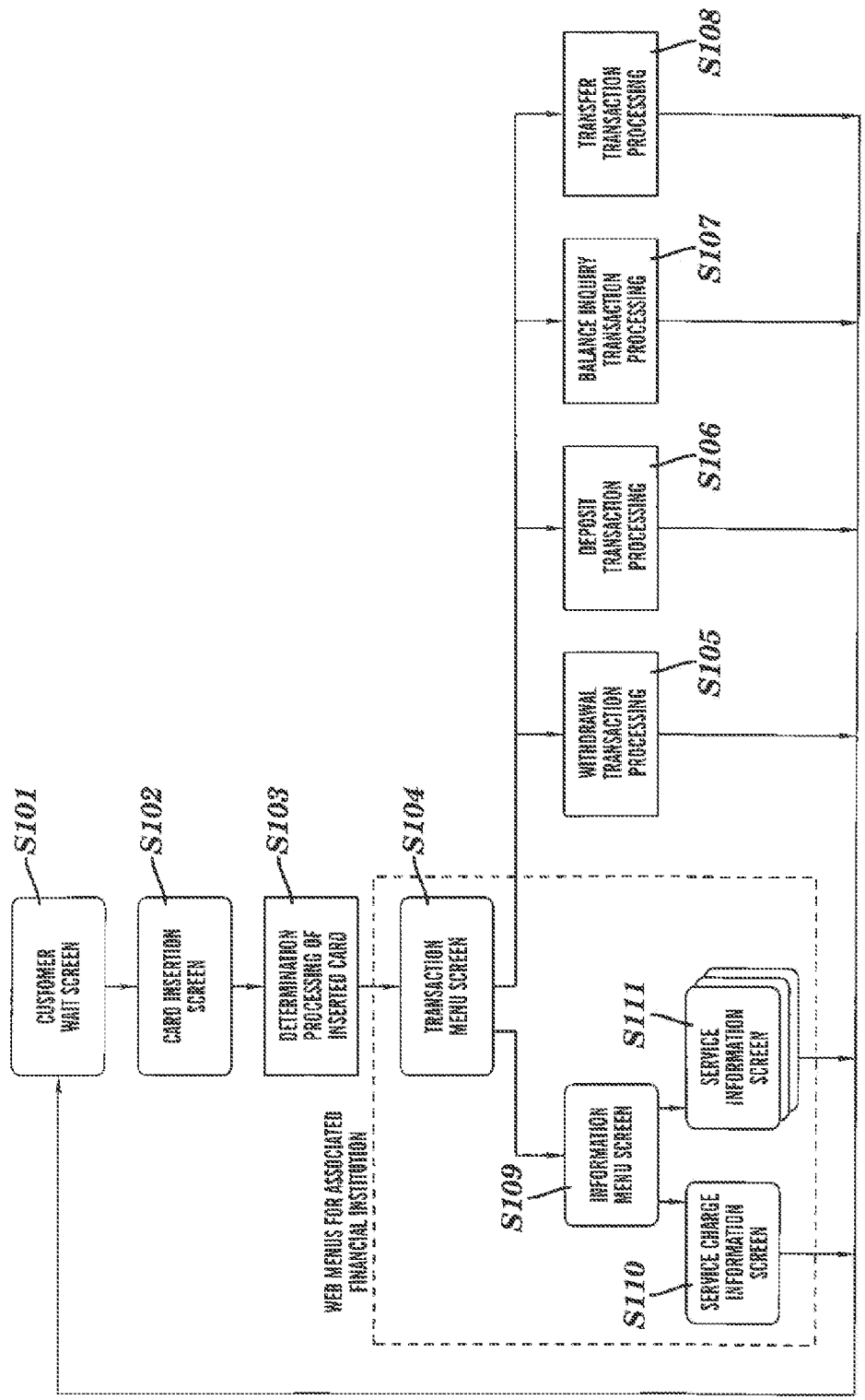
FIG. 5 is a diagram showing a flow of screen displays in each ATM.

In FIG. 5, there is shown a screen display flow for each ATM. Initially, on a display (screen) of each ATM, e.g., Bank A's ATM 11, Bank B's ATM 12 or Bank C's ATM 13, a customer wait screen such as a commercial message (CM) or the like is displayed before commencement of a transaction (step 101). When a user touches a screen at this stage, this leads to a transition to a card insertion screen (step 102). When a card is subsequently inserted into this ATM, determination processing of the inserted card is performed (step 103), and a menu screen for each bank (menu screen for Bank X) is read from the web contents in this ATM and is displayed (step 104). In the case of a simple transaction, for example, withdrawal transaction processing (step 105), deposit transaction processing (step 106), balance inquiry transaction processing (step 107) or transfer transaction processing (step 108), work is performed in accordance with the transaction menu screen in this ATM. Upon completion of the transaction, this ATM returns to the customer wait screen of step 101 before commencement of a next transaction. On the other hand, in a case of a consultation service or the like that does not require direct transaction processing, e.g., service charge information or service information, its associated content is obtained from the web server for each bank, which is located at relay center 21. In this way, an information menu screen of each bank (step 109) may be displayed. Thereafter, a service charge information screen (step 110), a service information screen (step 111) or the like is displayed and, upon termination of the transaction, the ATM returns to the customer wait screen of step 101. Note that steps 104 and 109-111 are those web menus independently and freely created by an associated bank, and if any modification is made, the modified content is stored at relay center 21.

Figure 6A:
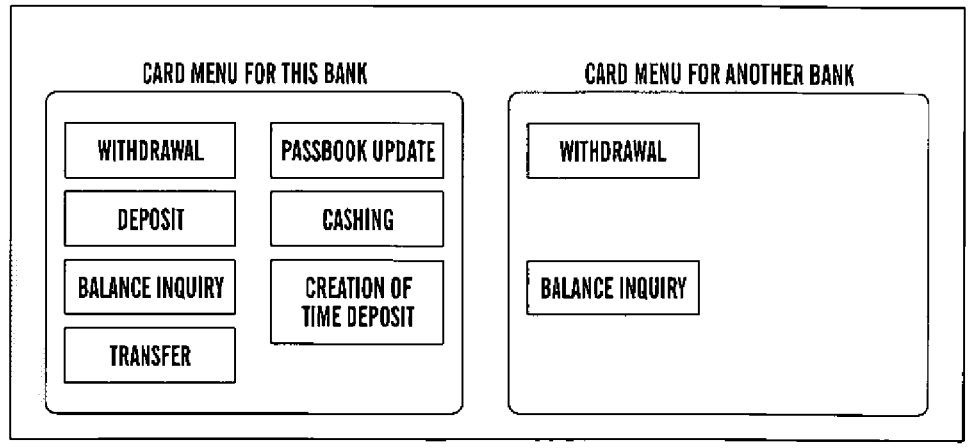
FIG. 6A is a pictorial representation illustrating menu processing in a prior art common ATM scheme.
Figure 6B:
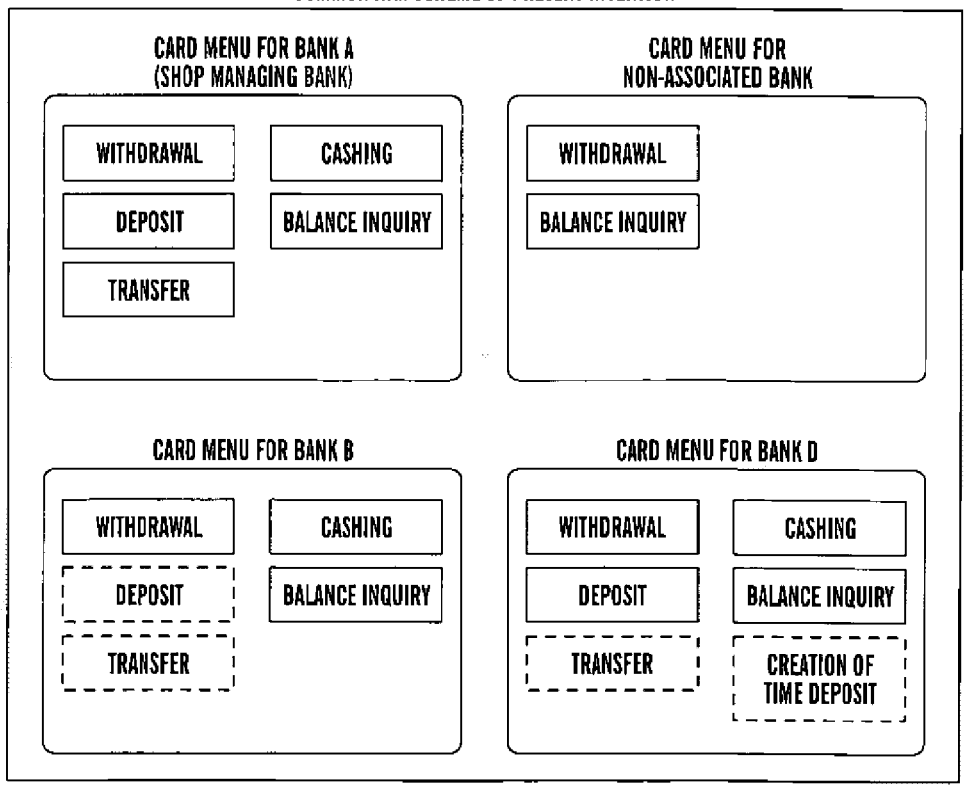
FIG. 6B is a pictorial representation illustrating menu processing in a preferred embodiment of the present invention.

FIGS. 6A and 6B are pictorial representations for comparatively explaining menu processing in the conventional common ATM scheme and menu processing in the present invention. More particularly, FIG. 6A shows a displayed example of a card menu in the conventional common ATM scheme, whereas FIG. 6B shows a displayed example of a card menu in the present invention. In the conventional common ATM scheme, there is only one menu screen in an ATM. For instance, a "card menu for this bank" may display all of the transaction menus provided by that bank, but "card menu for another bank" may display predefined transactions such as "withdrawal" and "balance inquiry" alone. In contrast, in the common ATM scheme of this invention, contents of screens created for each bank are previously stored in each ATM, as described above, and, thus, it is possible to display an appropriate screen associated with an inserted card. These screens may be created in the HTML format in the same manner as a home page on a web. In the present invention, an ATM display is independent of the ATM's inherent programs and, thus, generation of screens may be done by each bank. Therefore, in line with progress of development work at each bank, one or more menus may be added at the right time. For example, even if a card menu for Bank B does not currently cope with "deposit" and "transfer", they may be added in a simple manner whenever their associated programs or the like are subsequently developed by Bank B. Also, for a Bank D card menu, "transfer" and "creation of time deposit account" may be subsequently added.

Incidentally, if the speed of a network is significantly increased, this arrangement may be changed such that this screen information is acquired from a web server for each bank located at relay center 21 on a demand basis, rather than storing this screen information in each ATM. In such a case, it is unnecessary for each ATM to maintain individual screens.

As described, the present invention makes it possible to provide content created by a plurality of financial institutions at each ATM. Since a user is allowed to use any ATM for conducting his/her transaction under the guidance of a menu for a bank identified by his/her card, this will result in a high degree of usability and accommodation of a variety of transactions. Namely, each associated financial institution allows an ATM installed at an external location (e.g., convenience store) to have the same operational environment as its own ATM, and yet it allows such an ATM to have frequently modified contents (e.g., service information or the like) since the content may be easily modified.

Figure 7:
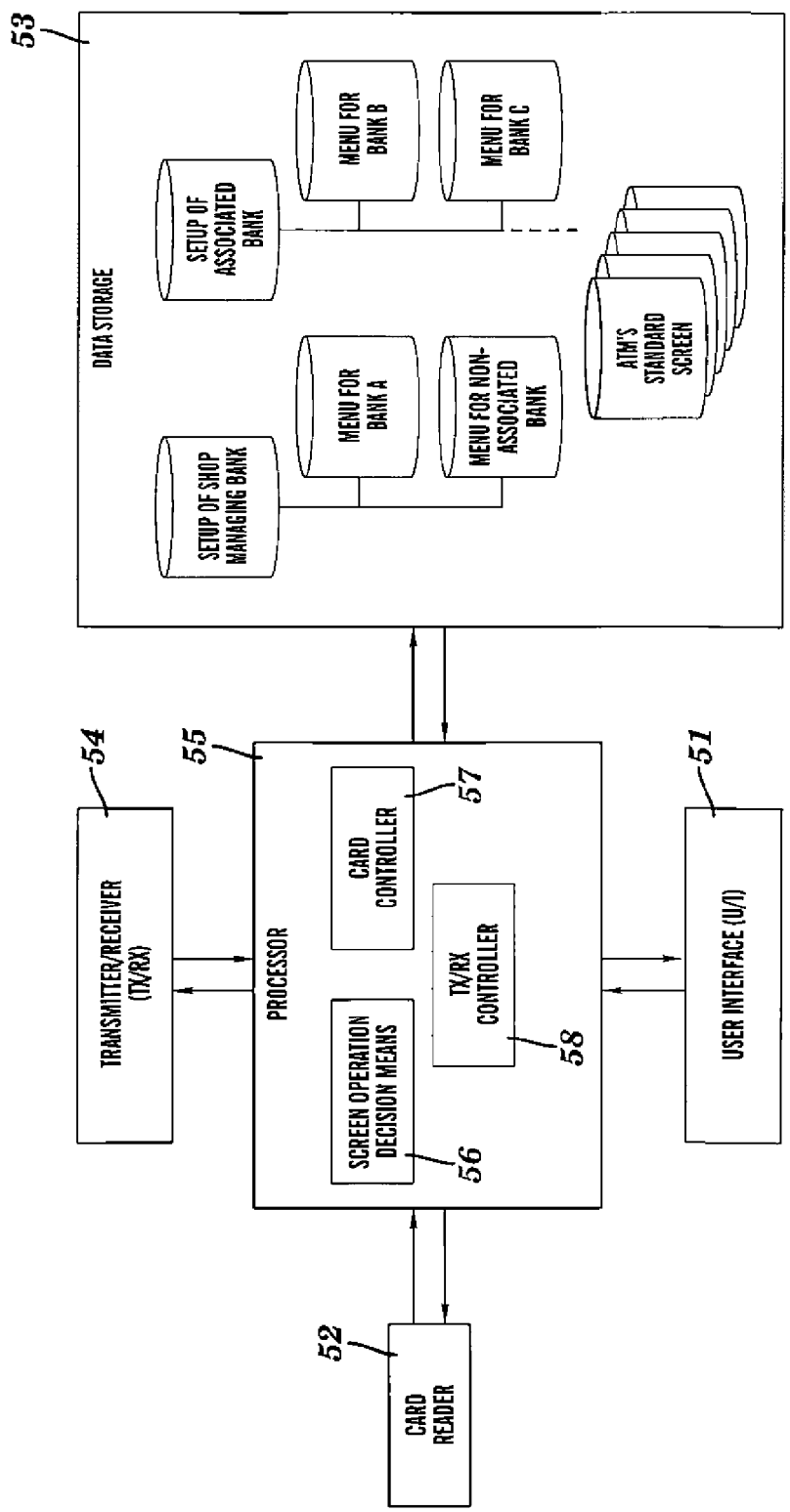
FIG. 7 is a block diagram showing a configuration of an ATM.

FIG. 7 is a block diagram showing a configuration of each ATM such as Bank A's ATM 11, Bank B's ATM 12 or Bank C's ATM 13. User interface (U/I) 51 displays a screen to a user, accepts an operational input from a user, and performs operational time-out processing or the like. Card reader 52 accepts a card or the like, which is a medium for identifying the user's account at a particular financial institution, reads the accepted card, and transfers the card information to processor 55. Data storage 53 is arranged to store a variety of menus or the like to be displayed on a display screen of U/I 51. FIG. 7 shows an exemplary case where Bank A is designated as a shop managing bank and, thus, menus for Bank A are stored in a setup area of shop managing bank. Transmitter-Receiver (TX/RX) 54 is provided with functions for transmitting/receiving data to/from relay center 21. Also, processor 55 is arranged to control the entire ATM. For this purpose, processor 55 is provided with a screen operation decision means 56 for processing screen operations or the like, a card controller 57 for performing control processing of a card, a TX/RX controller 58 for controlling TX/RX 54 and setting one or more messages or the like required for transmission and/or reception thereof, and the like.

Now, with reference to FIG. 7, a processing flow in the ATM will be briefly described. At the outset, a card insertion screen is displayed on U/I 51 under the control of screen operation decision means 56 in processor 55. Upon insertion of a card by a user, this card is accepted and read by card reader 52, whose data is then transferred to processor 55. At card controller 57 in processor 55, a financial institution number is read. Then, one or more financial institution numbers are received from data storage 53 for performing validation processing of the financial institution number read from the card and for deciding if it is related to this bank, an associated bank or a non-associated bank. At screen operation decision means 56, a menu screen to be displayed next is read from data storage 53. If this is normal work of the ATM, its standard screen is read. On the other hand, if this is the next screen of each bank, a menu for each bank is read from data storage 53. Otherwise, i.e., in case of a transaction with a non-associated bank, a menu for a non-associated bank is read from a setup file of shop managing bank. This menu is then sent to U/I 51 for displaying to the user. Also, contents of the transaction are assembled into a transmitting message at TX/RX controller 58 for transmission to a destined financial institution, which is set by TX/RX controller 58. The message so assembled is then transmitted by way of TX/RX 54. On the other hand, transaction content received by way of relay center 21 is processed by TX/RX controller 58 for outputting to U/I 51.

Figure 8:
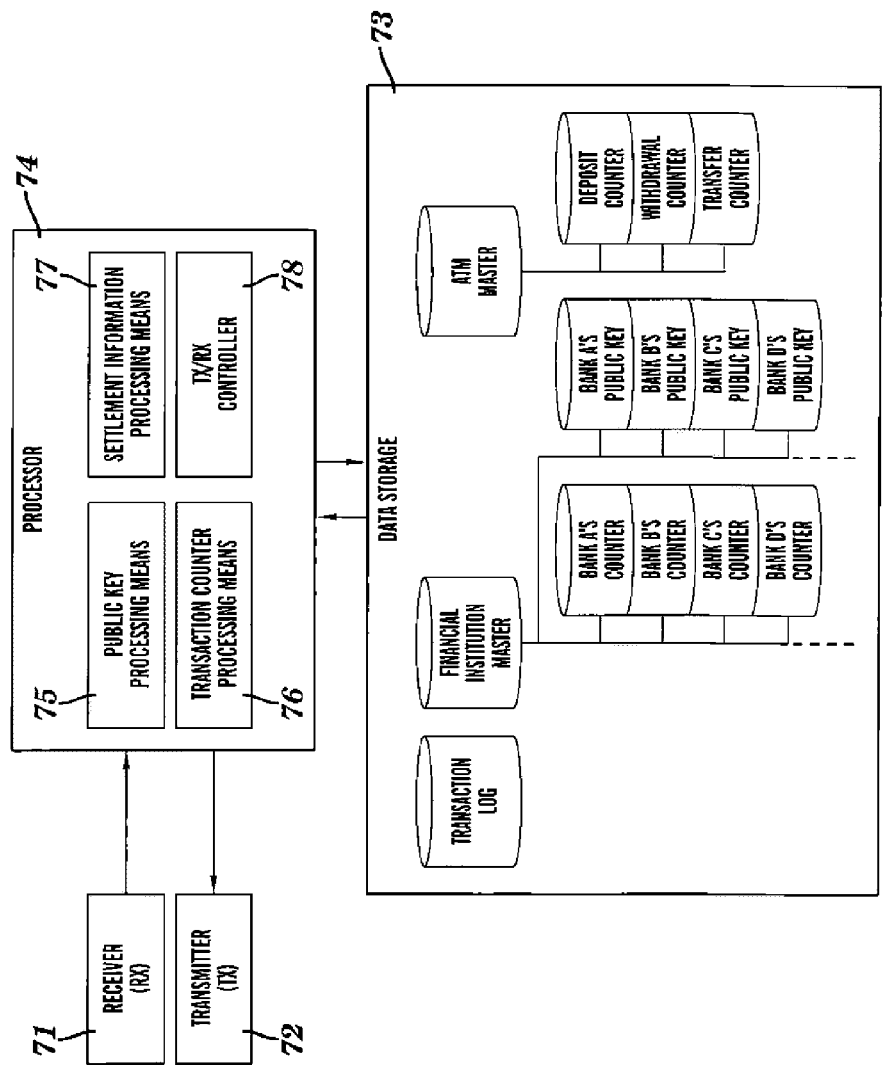
FIG. 8 is a block diagram showing an internal configuration of a relay center in accordance with a preferred embodiment of the present invention.

FIG. 8 is a block diagram showing an internal configuration of relay center 21. Receiver (RX) 71 receives a transaction request message from an ATM such as Bank A's ATM 11, and acquires counter information from each bank's center such as Bank A's center 14. Transmitter (TX) 72 transmits a transaction response message to an ATM such as Bank A's ATM 11, and transmits a transaction request message or a result of a counter exchange to each bank's center such as Bank A's center 14. In data storage 73, there is stored financial institution master data, including a transaction log, each bank's counter information and each bank's public key, as well as ATM master data, including a deposit counter, a withdrawal counter and a transfer counter. Processor 74 is provided with: 1) a public key processing means 75 for storing a modified public key from each bank in data storage 73 and for delivering a public key for each bank separately to an ATM; 2) a transaction counter processing means 76 for processing a transaction response message and for performing update processing of the counters and for maintaining consistency of each counter located at each bank's center and data storage 73; 3) a settlement information processing means 77 for accumulating settlement information by means of a counter exchange; and 4) a TX/RX controller 78 for controlling receiver (RX) 71 and transmitter (TX) 72.

Next, with reference to FIG. 8 and FIG. 2, a transaction counter processing flow will be described. For sake of convenience, it is assumed here that a card for Bank A is inserted into Bank C's ATM 13. Receiver 71 receives a transaction request message from Bank C's ATM 13, which has the card for Bank A inserted therein, and passes it to TX/RX controller 78 in processor 74. Since this is a transaction with Bank A, TX/RX controller 78 causes transmitter 72 to transmit the transaction request message to the FIG (FI gateway) of Bank A's center 14 (not shown). Then, the transaction request message is transmitted from the FIG of Bank A's center 14 to an account host system (not shown) in this center, where this transaction request message is processed by this account host system, a counter is updated, and a transaction response message is returned to the FIG. This FIG processes the transaction response message, updates a counter, and returns the processed message to relay center 21. Receiver 71 receives this transaction response message from Bank A's center 14, and passes it to processor 74. Transaction counter processing means 76 in processor 74 processes the transaction response message, updates a Bank A's counter in data storage 73, and writes it into the transaction log. Also, TX/RX controller 78 passes the transaction response message to transmitter 72, and causes transmitter 72 to return it to Bank C's ATM 13. In so doing, it is possible to pass a transaction request message and a transaction response message between Bank C's ATM 13 and Bank A's center 14. Incidentally, in an exemplary case where a user of an ATM inserts a card for Bank B, transmission/reception to/from Bank B's center 15 and processing of the Bank B's counter are performed. The above described processing enables to maintain consistency of each counter located at relay center 21 and each bank's center.

Next, with reference to FIG. 8, a flow of processing of gathering settlement information will be described. First, receiver 71 receives a counter request with counter information from a FIG of each bank's center. Settlement information processing means 77 writes the counter information into a counter log (not shown). Also, transmitter 72 transmits a counter response message, including the counter information resident in data storage 73, to a bank's center that originated the counter request. In each bank's center, the FIG counter and the counter information of relay center 21 are transmitted to its account host. On the other hand, after counter exchanges of all of the financial institutions are finished, settlement information processing means 77 located at relay center 21 accumulates settlement information from the counter log and the transaction log. Then, this settlement information is transmitted to a predetermined settlement bank. Preferably, a settlement bank may be arbitrarily selected from associated banks, and it is responsible for delivering cash money for ATMs on behalf of other banks, thereby enabling settlement processing in a more effective manner. A settlement bank may be determined separately from a managing bank of each ATM.

Thus, according to the present invention, it is possible to greatly improve the settlement work in comparison with the conventional common ATM scheme, which requires a large amount of settlement work in proportion to the possible permutations of banks involved. Because a transaction request with each bank is directly transmitted to its center, it is possible to accumulate transaction information of each bank at relay center 21 and to make a settlement there using this transaction information. Obviously, this leads to a settlement between a single settlement bank and another bank, thereby simplifying settlement processing among the banks.

Figure 9:
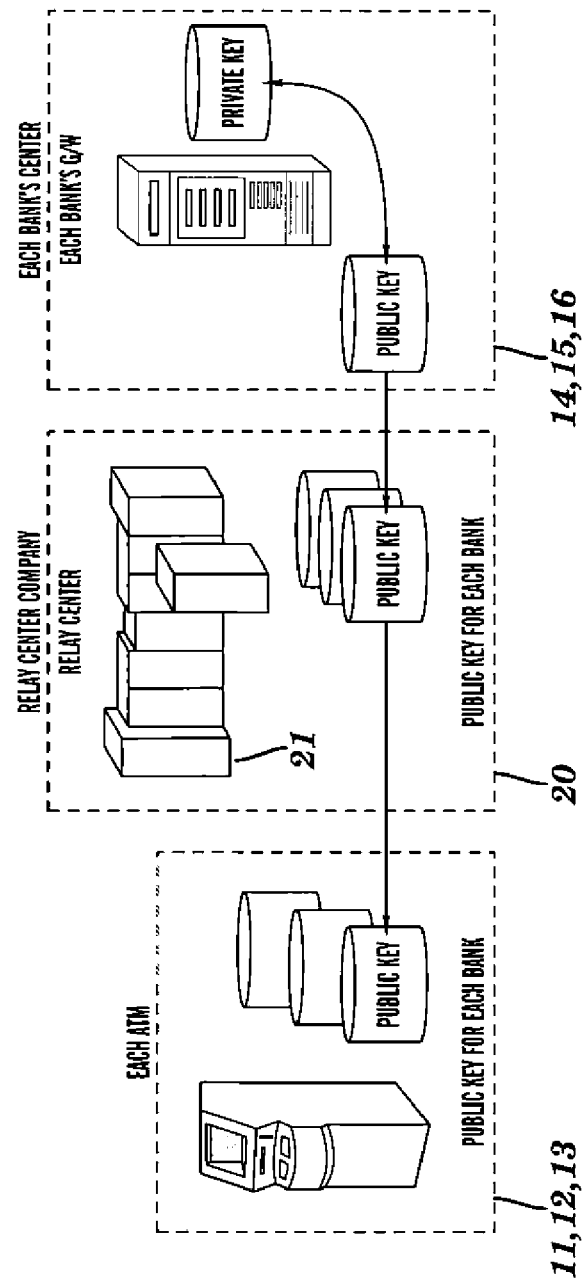
FIG. 9 is a pictorial representation illustrating an arrangement for enciphering a personal identification number inputted by a customer.

FIG. 9 is a pictorial representation illustrating an arrangement of enciphering a personal identification number inputted by a customer (user). The present invention is configured to prevent tapping from a line and/or observation of a customer's personal identification number at relay center company 20. First, in each bank's center such as Bank A's center 14, a public key and a private key are created. This public key is transmitted to relay center 21 of relay center company 20 from a server located at each bank's center. From relay center 21, this transmitted public key is automatically delivered to each ATM such as Bank A's ATM 11. In each ATM, transmitted public keys are contained for each bank separately. In so configuring, even if a public key is changed on a bank side, it is possible to change a content of a public key without recourse to any human or manual intervention. An exemplary public key scheme that may be employed is called "RSA" (Rivest-Shamir-Adlemanscheme) scheme. Security of the network is accomplished by a sequence of steps, comprising enciphering using this public key, converting it into binary information with Gold Message®, and then enciphering by a router function of Data Encryption Standard (DES). Each bank's center alone having a private key is enabled to decipher a personal identification number inputted by a customer and, thus, it is possible to overcome the problems such as leakage of a personal identification number on line and at relay center company 20. Further, while each bank is allowed to freely change an enciphering key, there is no need for relay center 21 to cope with the change by way of manual interventions at all.

As described above in detail, according to the present invention, a number of financial institutions are allowed to commonly use one or more ATMs installed by relay center company 20 and, thus, it is possible to implement the common ATM scheme on a nationwide basis.

Also, dissociating the common ATMs from each bank's center such that transaction information of each financial institution is accumulated at relay center 21 is also advantageous. In particular, a settlement can be made using the accumulated data. In addition, it is possible to designate a single settlement bank for delivering cash money to the common ATMs, and also make a settlement between a single settlement bank and another bank. These capabilities simplify settlement processing among the banks.

Further, even when an associated financial institution is added, it has no adverse effect on systems of the existing associated financial institutions.

Moreover, even in an exemplary case where a card for Bank B is inserted into Bank A's ATM 11 being managed by Bank A, it is possible to display a menu screen for Bank B, whereby possible transactions may be expanded depending on progress of system development of Bank B without recourse to another bank such as Bank A. Thus, it is possible to easily add or expand a menu for each associated bank separately.

Although the present embodiment has been described with reference to examples of transactions with banks, it will be apparent that the present system may be applied in a variety of financial institutions such as securities companies, life insurance companies, non-life insurance companies, leasing companies, etc. Further, a commonly used card has been described as a medium for identifying an account at each financial institution, it is apparent that this invention is not necessarily limited to such a card and another medium could be used instead.

As described above, according to this invention, it is possible to reduce system development efforts by financial institutions for providing a financial transaction system adapted for using one or more common ATMs. In addition, it is possible to simplify settlement processing of transactions based on ATMs of each financial institution.

Also, a customer who has an account at another financial institution is allowed to conduct his/her transaction at an ATM that is managed by a particular financial institution using a menu screen that is created by another financial institution.

What is claimed is:

1. A method of displaying financial transaction menu screens on a display of an automated teller machine that is managed by a predetermined managing financial institution, comprising the steps of:
   accepting a medium that has identification information for identifying an account at one of a plurality of financial institutions;
   identifying a financial institution based on said accepted medium; and
   if said identified financial institution is not said managing financial institution, displaying a financial transaction menu screen unique to said identified financial institution on said display of the automated teller machine in place of a menu screen created by said managing financial institution.

2. The method of claim 1, wherein after said financial institution is identified, an initial transaction menu screen, unique to said identified financial institution and previously stored in said automated teller machine, is displayed on said display of the automated teller machine, and one or more succeeding menu screens received from a remote location are displayed on said display of the automated teller machine.

3. A method comprising:
   displaying menu screens for use in financial transactions with a managing financial institution, an associated financial institution and a non-associated financial institution on a display of an automated teller machine that is managed by the managing financial institution, the displaying including:
      if a card for said managing financial institution is accepted, identifying said managing financial institution based on said card and displaying a menu screen unique to said managing financial institution on said display of the automated teller machine;
      if a card for said associated financial institution is accepted, identifying said associated financial institution based on said card and displaying a menu screen unique to said identified associated financial institution on said display of the automated teller machine; and
      if a card for said non-associated financial institution is accepted, displaying a menu screen for the non-associated financial institution created by said managing financial institution on said display of the automated teller machine.

4. A system of using an automated teller machine, the system comprising:
   an automated teller machine for identifying a financial institution based on an account identifying medium to conduct a financial transaction with a customer;
   a plurality of financial institution systems for conducting transactions with said automated teller machine; and
   a relay center for relaying transactions between said automated teller machine and said financial institution systems;
   wherein said relay center transmits a transaction request message from said automated teller machine to one of the financial institution systems identified by said automated teller machine without passing through another financial institution system, and wherein said relay center transmits a transaction response message transmitted from said identified financial institution system to said automated teller machine, and wherein said relay center includes a counter provided for each financial institution for a settlement among the plurality of financial institution systems.

5. The system of claim 4, wherein said identified financial institution system updates counters provided therein based on said transaction request message or said transaction response message, and wherein said relay center updates counters provided therein based on said transaction request message or said transaction response message.

6. The system of claim 5, wherein said relay center defines a settlement amount after exchanging information of the counters provided in said identified financial institution systems and the counters provided in said relay center.

7. The system of claim 6, wherein said automated teller machine is managed by a particular financial institution, wherein a settlement with said relay center is performed by said particular financial institution or a selected financial institution other than said particular financial institution, and wherein if a settlement is performed by said selected financial institution, said selected financial institution performs a settlement with another financial institution.

8. A system of using an automated teller machine, comprising:
   an automated teller machine for identifying a financial institution based on an account identifying medium to conduct a financial transaction with a customer via displaying a screen menu created by an associated financial institution identified by the account identifying medium, the screen menu being saved in the automated teller machine;
   a plurality of financial institution systems for conducting transactions with said automated teller machine; and
   a relay center for relaying transactions between said automated teller machine and said financial institution systems, said relay center including a counter provided for each financial institution for a settlement among the plurality of financial institution systems;
   wherein said automated teller machine enciphers a personal identification number inputted by said customer and transmits the enciphered personal identification number to said relay center for use in the identified financial institution, wherein said relay center transmits the enciphered personal identification number to the identified financial institution system, and wherein said identified financial institution system deciphers said enciphered personal identification number.

9. The system of claim 8, wherein said financial institution system has a private key and a public key, wherein said automated teller machine receives said public key from said financial institution system through said relay center, and enciphers said personal identification number using a public key which is different for each financial institution, and wherein said financial institution system uses the private key for deciphering said personal identification number enciphered by said public key.

10. An automated teller machine that is managed by a predetermined managing financial institution and is adapted for displaying menu screens for use in financial transactions on a display, the automated teller machine configured to:
   receiving menu screen information through a network, the menu screen information being created by each of a plurality of financial institutions;
   storing said received menu screen information;
   accepting a medium for identifying an account at a financial institution;
   identifying said predetermined managing financial institution or another financial institution based on said accepted medium; and
   in response to the identifying of said another financial institution, reading said stored menu screen information for said another financial institution for display of one or more menu screens of said another financial institution on said display of the automated teller machine.

11. The automated teller machine of claim 10, wherein said receiving of said menu screen information includes receiving said menu screen information from one or more associated financial institutions including said predetermined managing financial institution, and wherein said storing of said menu screen information includes:
   storing said received menu screen information from said one or more associated financial institutions; and
   storing said received menu screen information for a non-associated financial institution created by said predetermined managing financial institution.

12. The automated teller machine of claim 10, wherein said reading further includes displaying one or more menu screens based on said stored menu screen information for said non-associated financial institution that is created by said predetermined managing financial institution.

13. The automated teller machine of claim 10, wherein after the identifying of a financial institution, said reading further includes:
   immediately reading stored initial menu screen information for the identified financial institution; and
   reading succeeding menu screen information for the identified financial institution, received through the network.

14. A relay center connected between an automated teller machine and a plurality of financial institution systems through a network, the relay center configured to perform:
   receiving a transaction request message from said automated teller machine and for transmitting the transaction request message to a particular financial institution system identified by said automatic teller machine based on a medium identifying an account at the particular financial institution system, the transmitting being implemented without passing through another financial institution system;
   receiving a transaction response message corresponding to said transaction request message from said particular financial institution system and for transmitting said transaction response message to said automated teller machine; and
   updating a counter provided for each financial institution based on said transaction request message or said transaction response message for a settlement among the plurality of financial institution systems.

15. A relay center connected between an automated teller machine and a plurality of financial institution systems through a network, the relay center configured to perform:
   storing transaction content for each particular financial institution into a counter provided for each financial institution based on a transaction conducted between said automated teller machine and a particular financial institution system,
   wherein the stored transaction content for each particular financial institution is identified by accepting identification information contained within a medium via the automated teller machine prior to the storing of the transaction content for each particular financial institution;
   receiving counter information owned by said particular financial institution system from said particular financial institution; and
   transmitting information of said counter provided for each financial institution, which includes the stored transaction content, to said particular financial institution system;
   wherein the counter information is exchanged by said receiving of the counter information and said transmitting of the counter information and is used for a settlement among the plurality of financial institution systems.

16. The relay center of claim 15, further configured to accumulate settlement information that is operable after the exchange of the counter information among said plurality of financial institution systems.

17. The method of claim 1, wherein the accepting of the medium that has the identification information includes inserting at least one of a magnetic card or an integrated chip (IC) card into the automated teller machine.

18. The method of claim 17, wherein the identification information includes account numbers for a specific financial institution.

19. The method of claim 18, wherein the account numbers for the specific financial institution are related to one of the managing financial institution, an associated financial institution, distinct from the managing financial institution, or a non-associated financial institution.

20. The method of claim 1, wherein the identifying of the financial institution based on said accepted medium includes:
   determining whether the identification information of the accepted medium is associated with the managing financial institution;
   in response to determining the identification information of the accepted medium is identification information associated with the managing financial institution, displaying a financial transaction menu screen of the managing financial institution; and
   in response to determining the identification information of the accepted medium is not identification information associated with the managing financial institution, displaying a financial transaction menu screen unique to the financial institution identified by the identification information of the accepted medium.

* * * * *